(12) United States Patent
Ahmed

(10) Patent No.: US 7,854,389 B2
(45) Date of Patent: Dec. 21, 2010

(54) APPLICATION OF MICROSYSTEMS FOR COMFORT CONTROL

(75) Inventor: Osman Ahmed, Hawthorn Woods, IL (US)

(73) Assignee: Siemens Industry Inc., Alpharetta, GA (US)

( * ) Notice: Subject to any disclaimer, the term of this patent is extended or adjusted under 35 U.S.C. 154(b) by 952 days.

(21) Appl. No.: 11/512,751

(22) Filed: Aug. 30, 2006

(65) Prior Publication Data

US 2007/0084937 A1    Apr. 19, 2007

Related U.S. Application Data

(60) Provisional application No. 60/713,042, filed on Aug. 30, 2005.

(51) Int. Cl.
- F24F 3/14 (2006.01)
- G05D 23/00 (2006.01)
- F25B 49/00 (2006.01)
- G01M 1/00 (2006.01)

(52) U.S. Cl. .................. 236/44 C; 236/51; 62/176.6; 700/276

(58) Field of Classification Search .......... 236/44 C, 236/51, 94; 62/176.6; 700/276, 277, 278
See application file for complete search history.

(56) References Cited

U.S. PATENT DOCUMENTS

| | | | | |
|---|---|---|---|---|
| 5,346,129 A | * | 9/1994 | Shah et al. | ........... 236/44 C |
| 5,562,537 A | | 10/1996 | Zver et al. | |
| 5,711,480 A | * | 1/1998 | Zepke et al. | .......... 236/51 |
| 5,915,473 A | * | 6/1999 | Ganesh et al. | .......... 165/222 |
| 5,950,442 A | * | 9/1999 | Maeda et al. | .......... 62/175 |
| 6,116,512 A | * | 9/2000 | Dushane et al. | .......... 236/51 |
| 6,137,403 A | | 10/2000 | Desrochers et al. | |
| 6,145,751 A | * | 11/2000 | Ahmed | .......... 236/51 |
| 6,199,575 B1 | | 3/2001 | Widner | |
| 6,625,500 B1 | | 9/2003 | Li | |
| 2001/0025349 A1 | | 9/2001 | Sharood et al. | |
| 2001/0040509 A1 | | 11/2001 | Dungan | |
| 2002/0075163 A1 | * | 6/2002 | Smith et al. | .......... 340/870.16 |
| 2004/0008651 A1 | | 1/2004 | Ahmed | |
| 2004/0019392 A1 | | 1/2004 | Hirai | |
| 2004/0088082 A1 | | 5/2004 | Ahmed | |
| 2004/0144849 A1 | | 7/2004 | Ahmed | |

FOREIGN PATENT DOCUMENTS

EP    0 068 289    1/1983

(Continued)

OTHER PUBLICATIONS

Gnerre, Bill and Kevin Fuller. "Are Your Customers Comfortable? How do you know?" AutomatedBuildings.com. Interval Data Systems, Inc. Jul. 2006.

(Continued)

*Primary Examiner*—Chen-Wen Jiang (57) ABSTRACT

An arrangement includes a plurality of wireless microsystems. Each microsystem is operable to measure at least relative humidity and temperature, and to communicate temperature and relative humidity information wirelessly to a network device. The network device is operable to communicate the temperature and relative humidity information to at least a first processor configured to cause a change in a building control condition based on the information.

24 Claims, 5 Drawing Sheets

FOREIGN PATENT DOCUMENTS

| | | |
|---|---|---|
| EP | 0786 712 A2 | 7/1997 |
| EP | 0786712 A2 | 7/1997 |
| EP | 1 696 371 | 8/2006 |
| JP | 05 187695 | 7/1993 |
| JP | 05 187695 A | 7/1993 |
| WO | WO 97/48030 | 12/1997 |
| WO | WO 97/48030 A | 12/1997 |
| WO | WO 99/57697 | 11/1999 |
| WO | WO 00/54237 | 9/2000 |
| WO | WO 01/26330 | 4/2001 |
| WO | WO 01/35190 | 5/2001 |
| WO | WO 01/93220 | 12/2001 |
| WO | WO 2004/038525 | 5/2004 |

OTHER PUBLICATIONS

Arens, Edward, et al, "Thermal Comfort Under an Extended Range of Environmental Conditions." *Center for the Built Environment*. Berkeley, University of California: 1986.

PCT International Search Report -2005P13544WO International App. No. PCT/US2006/033566.

\* cited by examiner

APPLICATION OF MICROSYSTEMS FOR COMFORT CONTROL

This application claims the benefit of U.S. Provisional Patent Application Ser. No. 60/713,042, filed Aug. 30, 2006, which is incorporated herein by reference.

FIELD OF THE INVENTION

The present invention relates to indoor environmental control, and more particularly to HVAC control based at least in part on relative humidity and temperature.

BACKGROUND

Buildings in which people work and live have systems that monitor and sustain the comfort level of the building environment. Such systems include heating, ventilation and air conditioning (HVAC) systems, lighting systems, as well as others. HVAC and lighting systems have existed, at least at some level, for thousands of years.

HVAC and lighting systems have become sophisticated, and are often able to maintain careful balances of humidity and temperature, as well as provide fresh air and adequate light within buildings. Suitable temperature, humidity, light and oxygen levels contribute to the indoor environmental quality of a building or work place. Good environmental quality can translate to better productivity and health of the occupants.

The majority of building control systems maintains the occupants comfort by simply maintaining space temperature, which is measured using a thermostat or temperature sensor located on a wall. Although there is a strong correlation between temperature and human comfort, a better comfort index can be measured when the temperature is combined with relative humidity.

Combined temperature and humidity level is a better measure of heat or thermal energy content in a room and it is that thermal energy that needs to be removed (i.e. cooled) or supplemented by more energy (i.e. heated) to maintain the occupants at a comfortable level. The combined temperature and humidity levels are often termed as the "heat index" by the meteorological media.

As yet, however, there has been limited application of the combined heat/humidity index in the building control or HVAC industry. Costs related to sensing both temperature and relative humidity on a comprehensive scale has hindered such applications.

There is a need, therefore, for a cost-effective solution for implementing comfort control in buildings that takes into account both relative humidity and temperature.

SUMMARY OF THE INVENTION

The present invention addresses the above described needs, as well as others, by employing wireless MEMS microsystems that may be produced in bulk, and which measure both temperature and relative humidity, and communicate information representative of the measured information, preferably wirelessly, to data processing equipment.

A first embodiment of the invention is an arrangement that includes a plurality of wireless microsystems, each microsystem operable to measure at least relative humidity and temperature. Each microsystem is preferably operable to calculate and communicate a combined temperature and relative humidity index and communicate the heat index wirelessly to a network device. In other embodiments, the microsystem transmits both temperature and relative humidity measured data and the index is calculated in another part of the system. In either event, the network device is operable to communicate the parameters to one or more controllers that can adjust flow rate of heated or cooled air to a room based on the heat index.

In some cases, when the heated and/or cooled air is provided to each room via a ventilation system, the heat index of the chilled and/or cooled air is also known or obtained through the use of microsystems. In such a case, when the controller adjusts the flow rate, the controller takes into account the temperature/relative humidity information of the supply air as well as the temperature/relative humidity information for each room.

In other embodiments, some or all of the microsystems need not be wireless. However, there is an advantage to the use of wireless microsystems because it reduces labor and material costs associated with running wires.

The above described features and advantages, as well as others, will become more readily apparent to those of ordinary skill in the art by reference to the following detailed description and accompanying drawings.

DETAILED DESCRIPTION

Figure 1:
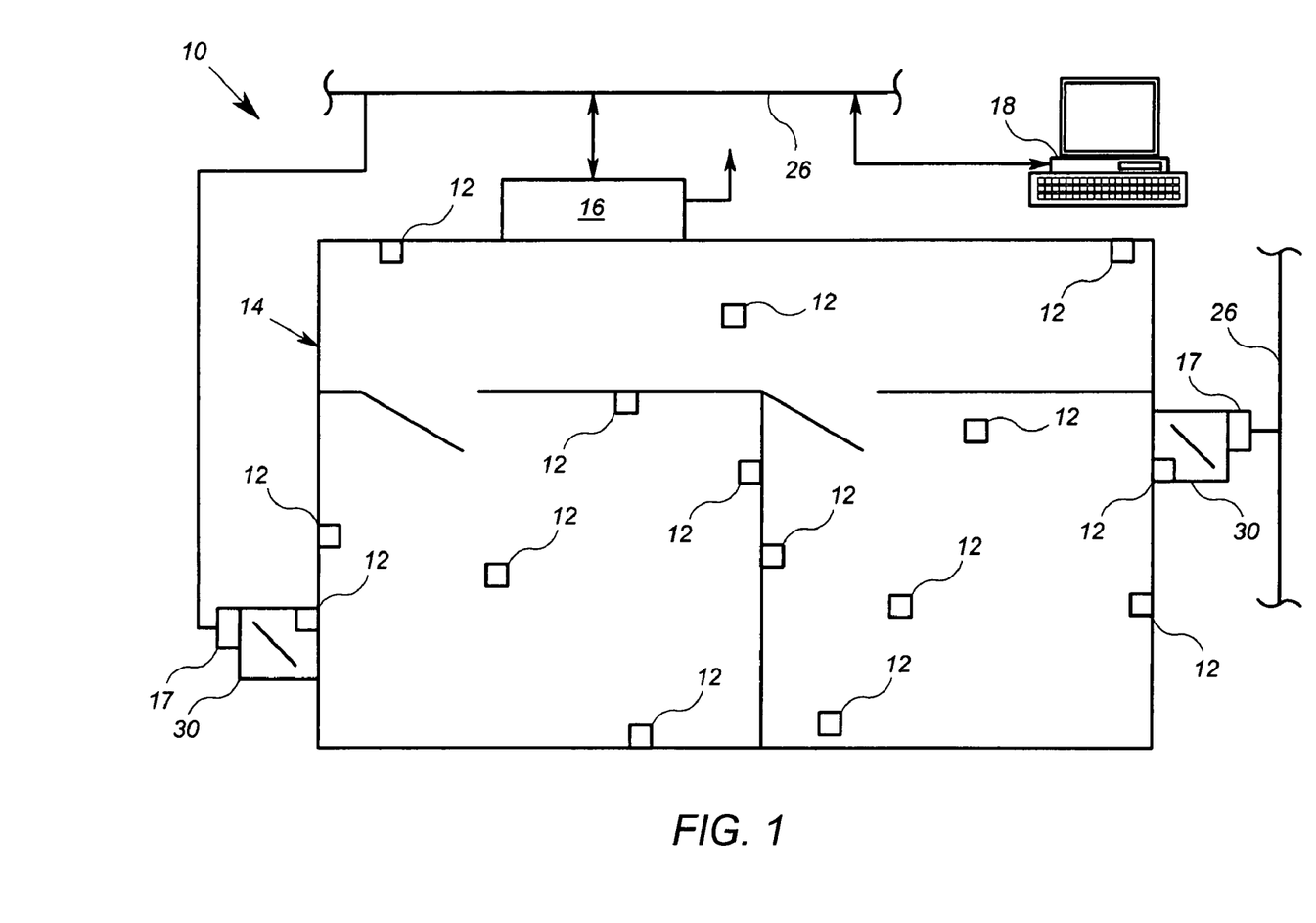
FIG. 1 shows a schematic block diagram of an exemplary embodiment of an arrangement according to the invention.

FIG. 1 shows an arrangement 10 that includes a plurality of wireless microsystems 12, each microsystem 12 is operable to measure at least relative humidity and temperature parameters in a building environment 14 and is further operable to communicate the parameters (either individually, or combined to form a comfort index) wirelessly to a network device 16. The network device 16 is operable to communicate the comfort index information from the plurality of microsystems 12 to room controllers 17. The room controllers 17 are operable to generate control signals that cause ventilation shaft dampers 30 to further open or close in order to adjust the flow of supply air (which may be heated or chilled), into the various rooms of the building environment 14.

Figure 4:
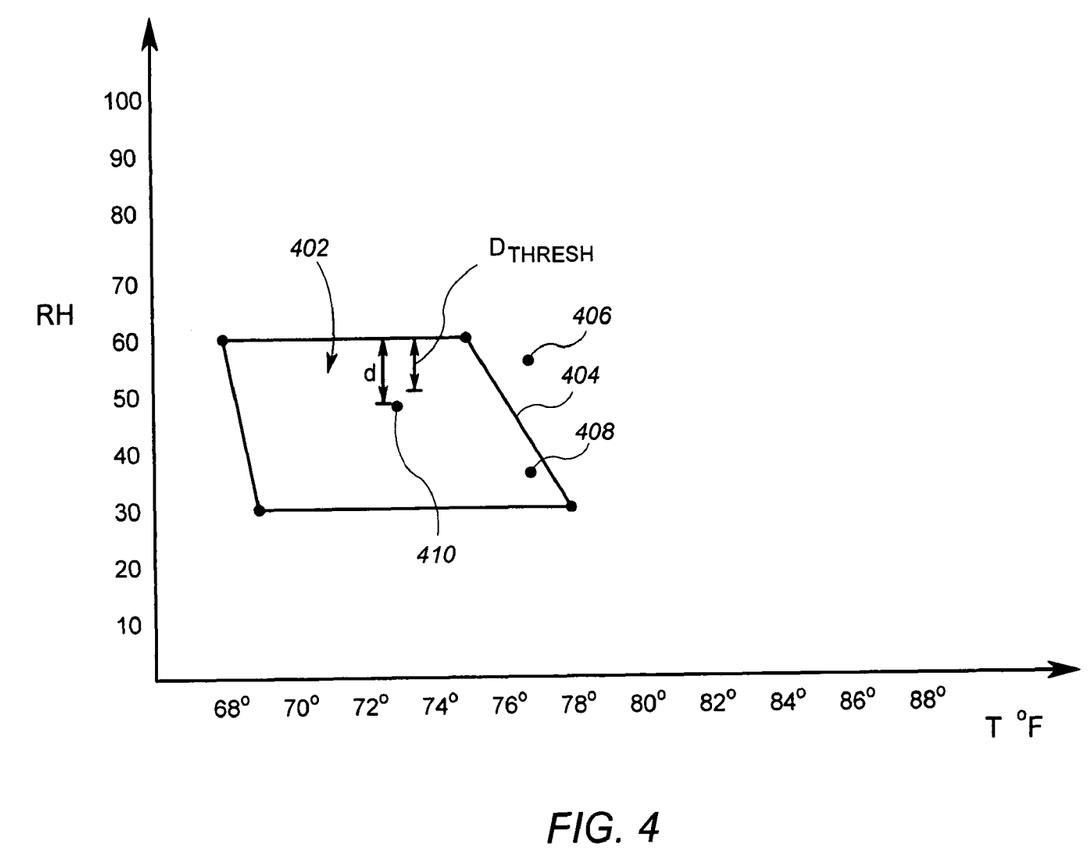
FIG. 4 shows a temperature vs. relative humidity graph that identifies an exemplary comfort zone.

The comfort index is a variable representative of a theoretical comfort level based on relative humidity and temperature. It is known that the same temperature may feel comfortable at 50% relative humidity, but less comfortable at much higher or lower humidity values. FIG. 4, which will be discussed further below in detail, shows a graph of temperature versus relative humidity. The graph of FIG. 4 includes a comfort zone 402 defined by a comfort zone perimeter 404. When both the temperature and relative humidity are at values that fall within the comfort zone 402, the conditions are considered to be comfortable. The comfort zone 402 is based on the ASHRAE comfort index standard.

In some embodiments described herein, the comfort index may suitably be a two element vector (t, rh) where t is the "dry bulb" temperature and rh is the relative humidity. Thus, each comfort vector (t, rh) identifies a particular point on the graph of FIG. 4. For example, the comfort index/vector (77, 35) is represented as point 408 on the graph of FIG. 4, and thus falls within the comfort zone 402.

In other embodiments, the vector points of the graph of FIG. 4 may be translated or mapped to scalar comfort values (e.g. from 1-10) based on perceived comfort at each combination of temperature and relative humidity. For example, the publication "Are Your Customers Comfortable? How Do You Know" by Bill Gnerre and Kevin Fuller (in July 2006 AutomatedBuildings.com), incorporated herein by reference, shows one method of creating a table that translates points on the temperature versus relative humidity graph into a comfort index value. Such a table could be stored and used by the microsystems 12 to generate a single comfort index value. In other embodiments, controllers such as the controller 17 or 18 may translate the comfort vectors (t, rh) to a single value as necessary or desirable.

In any event, the network device 16 and/or the room controllers 17 are further operable to communicate the comfort index information from one or more rooms or microsystems 12 to a central data processor 18 that is able to generate information regarding the comfort index for the building 14 for display, data recording, or for more complex control operations. If the comfort index information is in the form of a (t, rh) vector, then the central data processor 18 may optionally convert the information to a single index value for use in display or data recording.

Figure 2:
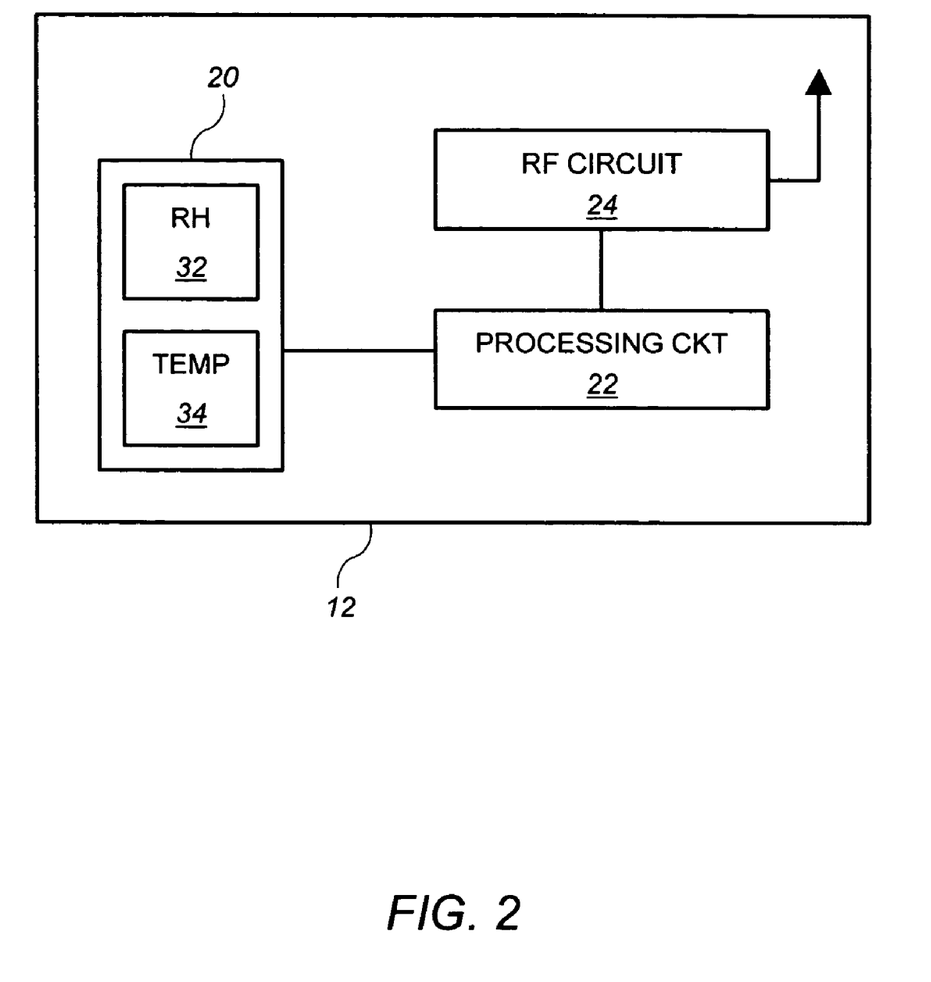
FIG. 2 shows a block diagram of an exemplary microsystem device that may be used in the arrangement of FIG. 1.

Referring to FIG. 2, the current state of the art of microsystems is sufficient to create a microsystem operable to measure and/or monitor temperature and relative humidity parameters. Each microsystem 12 may therefore employ a MEMS sensor suite 20 that includes a MEMS humidity sensor and a MEMS temperature sensor. Other embodiments may include a MEMS flow sensor, if flow is used as a parameter in the comfort index. The microsystem 12 may also incorporate processing circuitry 22, as well as radio frequency transmission circuitry 24. General examples of MEMS devices having processing circuitry and RF capability are discussed in U.S. patent application Ser. No. 10/353,142 entitled "Building System with Reduced Wiring Requirements and Apparatus for Use Therein", filed Jan. 28, 2003, and U.S. patent application Ser. No. 10/672,527, filed Sep. 26, 2003, entitled "Building Control System Using Integrated MEMS Device", both of which are incorporated herein by reference. Other devices of this nature are known.

In one embodiment, the processing circuitry 22 is programmed or otherwise configured to generate a heat or comfort index based on the relative humidity measurements and temperature measurements obtained by the MEMS sensor suite 20. The processing circuitry 22 is further operable to cause the RF circuit 24 to communicate that index wirelessly to the network device 16. In other embodiments, the processing circuitry 22 merely obtains the sensor values and provides those values (preferably with some low pass filtering) to the RF circuit 24 for transmission to the network device 16. The RF circuit 24 may suitably use Bluetooth or other short range RF transmission technology. The microsystem 12 may further include a battery, not shown, to power the operations.

Referring again to FIG. 1, the network device 16 may suitably be an RF transceiver connected to a building control system wired or wireless network 26, such that described in U.S. patent application Ser. No. 10/353,142, the disclosure of which is incorporated herein by reference. In some embodiments, the network device 16 is co-located with one or more the controllers 17 in a traditional field controller panel as is known in the art. However, in the disclosed embodiment, the controllers 17 are located proximate to the dampers 30 they control, and may be hardwired or wirelessly connected to the network device 16. The principles of this embodiment of the invention do not require either option over the other.

The ventilation dampers 30 are devices coupled to chilled or heated supply air shafts, not shown, and which are configured to controllably admit supply air into a room of the building environment 14, as is known in the art. The controllers 17 are operably coupled, through actuators, not shown, to cause the ventilation dampers 30 to open or close to adjust the amount of supply (heated or chilled) air into the room. In the embodiment described herein, further microsystems 12 are provided at or near the ventilation dampers 30 that can measure comfort index-related characteristics (e.g. temperature and/or relative humidity) of the supplied air. The controller 17 may therefore use the comfort index information from the room associated with a particular ventilation damper 30 and the conditions of the supply air to determine how much the ventilation damper 30 should be open to help bring the comfort index to an appropriate level. In some cases, the humidity and temperature of the supply air is not required by the controller 17.

The desired comfort index of a room or space may be determined by a set point provided by the central data processor 18. This set point may be a single comfort level value which is then compared to the measured comfort level expressed as a single value as described above (i.e. not as a two-dimensional vector).

The central data processor 18 may suitably be a computer workstation that is connected to the building control system network 26. In the embodiment in which the arrangement 10 uses a building control system network, then the central data processor 18 may suitably be a control station of the building control or automation system, such as an INSIGHT™ Workstation available from Siemens Building Technologies, Inc. of Buffalo Grove Ill., and which is used in the APOGEE™ brand automation systems.

Figure 5:
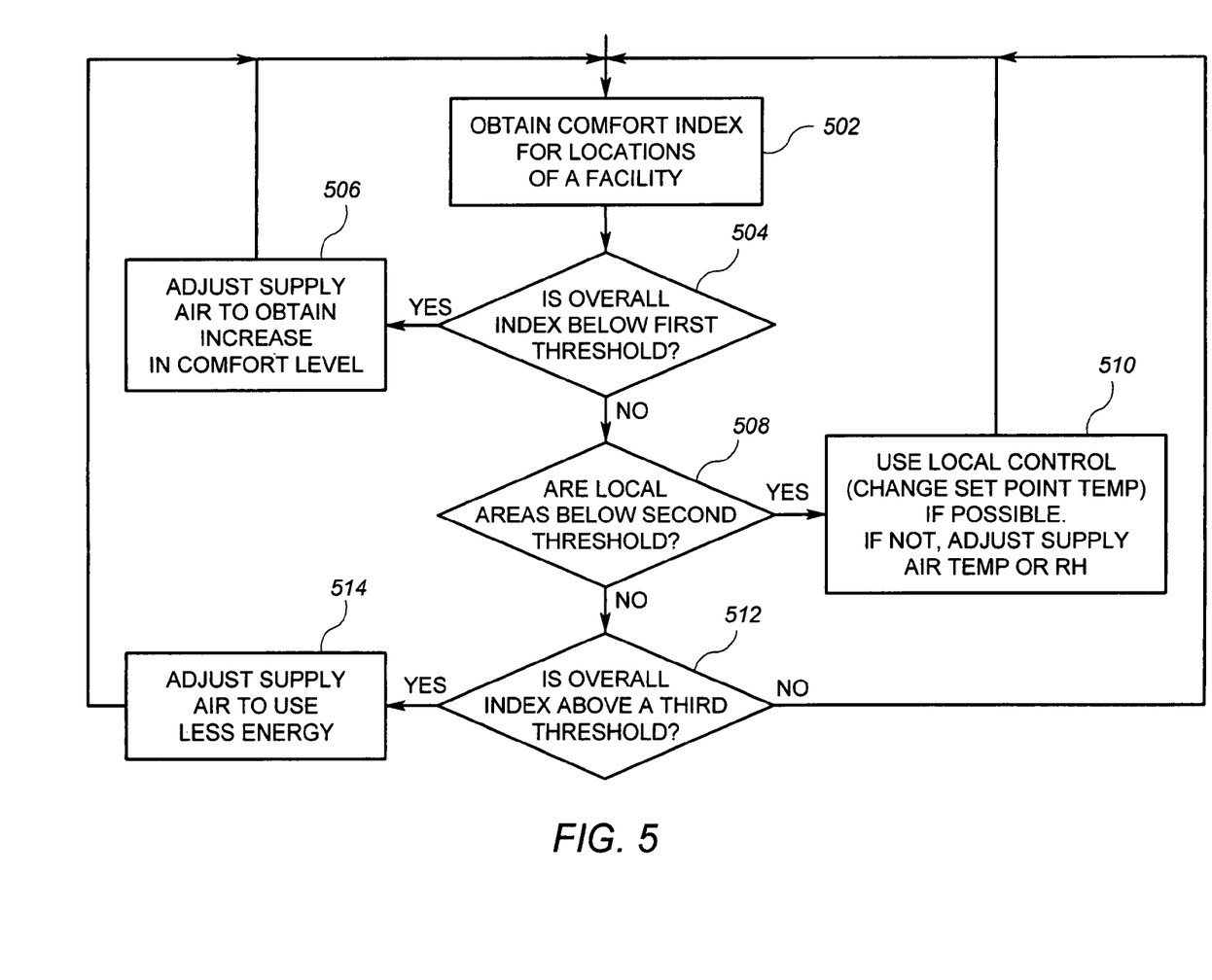
FIG. 5 shows a flow diagram of an exemplary set of operations that may be used by a central controller for a building using comfort level information in accordance with one embodiment of the invention.

The central data processor 18 may coordinate the received comfort index information from microsystems of a plurality of rooms to execute more sophisticated control modes. To carry out the more sophisticated control modes, the central data processor 18 may recalculate or adjust set points for the comfort index for each of the controllers 17, and communicate the adjusted set points to the controllers 17 via the building network 26. FIG. 5, discussed further below, illustrates a set of operations that central data processor 18 may carry out using comfort index information from a plurality of rooms.

One advantage of some embodiments of the invention is that the microsystems 12 may be employed extensively throughout the building at a reasonable cost, because of the ability to mass produce the devices. The use of MEMS devices as at least the sensors reduces the power consumption of relative humidity and temperature sensing. Moreover, the use of microsystems that employ MEMS devices enables the microsystem to be embodied as a wireless device, due to the low power consumption of the MEMS devices. The use of such wireless devices drastic reduces the labor and costs associated with installation by eliminating wiring. In addition, the microsystems 12 are small and may be placed on walls, fixtures, the floor, and even on moveable objects.

The use of comfort index as a control set point may be carried out in a variety of other ways. In one mode, the controller 17 receives temperature and humidity information (i.e. as a vector or otherwise) from the sensors 12 and controls the dampers 30 based on the information. In this mode, the controller 17 searches for a room condition that is along the perimeter of the comfort zone to minimize energy consumption. (See, e.g., FIG. 4). The comfort zone is the range of combined humidity and temperature combinations that satisfy ASHRAE comfort guidelines for human occupants. However, other standards for comfort zones may be used. In the economic mode, the controller 17 could determine the combination of humidity and temperature that is most economically achieved, given the temperature and humidity of the room and the supply air.

Such a mode is sometimes referred to as floating point set point control because different rooms or spaces may be controlled to different temperatures based on their humidity levels.

Figure 3:
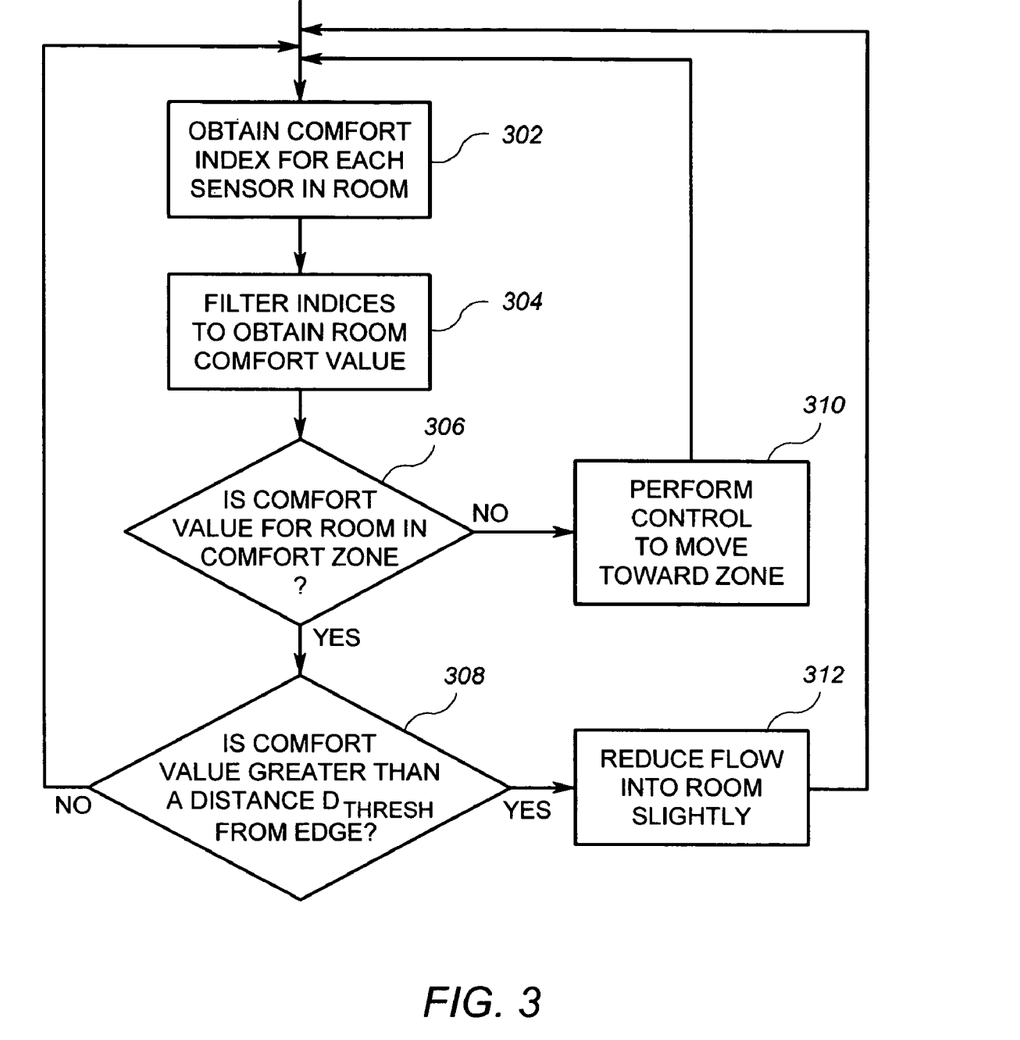
FIG. 3 shows a flow diagram of an exemplary set of operations that may be used by a ventilation damper controller for a space in accordance with one embodiment of the invention.

FIG. 3 shows an exemplary set of operations that employ a simplified type of floating set point control in a room of a building based on comfort index information. In the set of operations of FIG. 3, it will be assumed that the room has a plurality of comfort measurement microsystems similar to the microsystem 12 of FIGS. 1 and 2. It is also assumed that the main method of controlling the comfort is to adjust the flow of chilled air into the room via the ventilation damper 30 and its associated controller 17. (See FIG. 1). xxx The operations of FIG. 3 are carried out by a field controller such as the controller 17 of FIG. 1. In the embodiment of FIG. 1, each controller 17 performs the operations of FIG. 3 separately for each room for which it controls the ventilation damper 30.

In step 302, the controller 17 obtains the comfort index information for each sensor 12 in the room or space associated with a damper 30. In this embodiment, each space or room preferably has three to six microsystem devices 12. (See FIG. 1). Thus, the controller 17 receives as many comfort index values. In the operations of FIG. 3, it is assumed that the comfort index information is the vector (t, rh) that includes a temperature value and a relative humidity value. The controller 17 may suitably receive the sensor values wirelessly, as discussed above in connection with FIG. 1.

In step 304, the controller 17 generates performs a filter on the index values (t, rh) to obtain a comfort value or vector for the room. The filter may obtain an average of the index values, a mean of index values, or an average or mean of all but the highest and lowest index values. Other filtering mechanisms may suitably be used. The controller 17 after step 304 has a single comfort value or vector $(t_{sp}, rh_{sp})$ for the space or room. In this example, the $t_{sp}$=mean (all t values from microsystems 12 in room), and $rh_{sp}$=mean (all rh values from microsystems 12 in room).

In step 306, the controller determines whether the comfort value for the room is within the comfort zone thresholds. In particular, the controller determines whether the vector value $(t_{sp}, rh_{sp})$ falls within a predefined comfort zone window. To this end, the controller 17 may effectively plot the vector value $(t_{sp}, rh_{sp})$ against the graph of FIG. 4. If the vector value $(t_{sp}, rh_{sp})$ falls within the comfort zone 402, then the processing circuit proceeds to step 308. If not, then the controller proceeds to step 310.

Thus, for example, if the vector value $(t_{sp}, rh_{sp})$ is (77, 56), such as point 406 of FIG. 4, then the vector value falls outside the comfort zone 402 and the controller proceeds to step 310. If however, the vector $(t_{sp}, rh_{sp})$ is (77, 35), such as point 408 of FIG. 4, then the vector value falls inside the comfort zone 402 of and the controller proceeds to step 308. The determination of whether a particular point falls within the comfort zone 402 may be done a number of ways, including determining whether the vector value falls on the proper side of each line or slope that defines the perimeter 404.

Referring again to FIG. 3, in step 310 (vector outside of comfort zone 402), the controller 17 performs suitable control operations to attempt to change the comfort vector value such that the comfort vector value move toward the comfort zone 402. In general, the controller 17 in step 310 will cause the damper 30 to open further to allow more chilled air to advance into the room. However, the controller 17 may determine, based on the temperature information $t_{sp}$, that the room is too cool, and thus the controller would cause the damper to close to reduce the amount of chilled air that advances into the room. The controller 17 may suitably use PI, or PID control techniques to determine how much to adjust the air flow based on the comfort index value and its position vis a vis the comfort zone 402.

Referring again to step 308 (vector value in the comfort zone 402), the controller 17 determines whether the comfort value vector $(t_{sp}, rh_{sp})$, which has already been determined to be within the comfort zone 402, is greater than a threshold distance $D_{thresh}$ from the perimeter 404 of the comfort zone 402. In general, if vector value identifies an interior point of the comfort zone, such as the point 410, which is at a distance d greater than a threshold distance $D_{thresh}$ from the perimeter 404 of the comfort zone 402, then it is known that less chilled air may be advanced into the room without causing the room comfort index to move completely out of the comfort zone. In other words, the air conditioning may be reduced, thereby causing the temperature to rise, but only such that the comfort level remains within the borders of the comfort zone 402.

If the vector value $(t_{sp}, rh_{sp})$ is greater than the threshold distance $D_{thresh}$ from the perimeter 404, then the HVAC system may be operating inefficiently because adequate comfort could be maintained while using less energy. Thus, for example, if the current comfort value vector is at point 410, then the cooling air may be reduced, causing the comfort value vector to move from point 410 towards the sloped line between 75° F. and 78°. While the temperature (and possibly relative humidity) rises as a result of reduced cooling air, the comfort index may still lie within the acceptable ranges.

Thus, in step 308, the controller 17 determines whether the comfort vector value of the room is more than a distance $D_{thresh}$ from the perimeter. If so, then the controller 17 proceeds to step 312. If not, then the controller 17 may suitably return to step 302 and repeat the process, preferably after a predefined time interval.

It is noted that it is possible that even if a vector value is on the perimeter 404, inefficiencies may still exist if the vector value is situated on the "wrong" side of the perimeter. For example, if the vector value of a room is (69, 40) during the summer season, and thus the vector value is very near or on the left border of the perimeter 404, it is likely still possible to significantly reduce the chilled air into the room without danger of moving out of the comfort zone. In such a case, the HVAC system is operating inefficiently despite the fact that the vector value is very close to the perimeter 404. As a consequence, while the determination of whether the comfort value vector is more than a threshold distance from the perimeter 404 can identify instances of inefficiency, it cannot identify all instances of inefficiency.

Those of ordinary skill in the art may readily devise additional or alternative determinations in step 308 to detect such inefficient conditions and move to step 312 as a result thereof. However, in the rudimentary example described herein, it is simplest to determine whether the comfort vector is at a significant distance from any part of the perimeter 404 and reduce the air flow through the damper 30 as a result thereof.

Regardless, in step 312, the controller 17 causes the damper 30 to reduce the flow of chilled air into the room. The reduction may be minor, so as to ensure that the comfort index does not fall out of the comfort zone 402. The controller 17 then returns to step 302.

While FIG. 3 shows an exemplary set of operations that may be performed to adjust a damper based on comfort index to achieve a comfortable environment and an efficient system, there are also uses for the comfort information gathered by microsystems in other building control operations. For example, FIG. 5 shows an exemplary set of operations that another controller, for example a central control station such as the central data processor 18, may use to control other aspects of building control operations based on comfort level values.

Referring now to FIG. 5, the operations described herein may suitably be performed by a processing device that is operable connected to provide control messages or signals a variety of HVAC devices. Ordinarily, a central control processor such as the central control processor 18 of FIG. 1 would perform such operations.

In step 502, the processor obtains comfort index values for a plurality of locations of a facility. For example, the processor may obtain comfort vector values $(t_{sp}, rh_{sp})$ for each room or space in the building.

In step 504, the processor determines whether the overall comfort level of the building is outside tolerable range. To this end, the processor first determines an overall comfort level based on the received vector values for all (or many) of the spaces in the building. The overall comfort level may comprise a mean comfort value, or some weighted or statistically adjusted average of the comfort values for all the rooms and spaces. It will be appreciated that the mean of each of the $t_{sp}$, $rh_{sp}$ values of the comfort vector $(t_{sp}, rh_{sp})$ is not as useful in determining the overall building comfort. It is not the average temperature and average relative humidity that is most useful, but instead, the average "comfort level". Accordingly, it is more useful to quantify the comfort vector $(t_{sp}, rh_{sp})$ as a single comfort value, such as is discussed further above, prior to determining the overall building comfort level.

To this end, as discussed above and in the Gnerre article, each $(t_{sp}, rh_{sp})$ vector value may be mapped to a single corresponding scalar comfort level (e.g. a scalar value from 1-10). This comfort level value is referred to herein as CL. The value CL is expressed as $CL=F(t_{sp}, rh_{sp})$, where F is a function that could include a table lookup of a CL value assigned to each potential vector value $(t_{sp}, rh_{sp})$. By way of example, the table may indicate that all of the comfort vectors within the comfort zone 402 of FIG. 4 map to CL values of 9 or 10. Vectors located just outside the perimeter 404 may map to CL values from 6 to 8, and vectors further afield may map to CL values of 5 or lower. The appropriate mapping of comfort vector values $(t_{sp}, rh_{sp})$ to the CL values may be determined experimentally, or using various studies available on the Web, including the Gnerre article. FIGS. 2 and 3 of the Gnerre article show one mapping scheme that may be used.

Thus, for the remainder of the discussion of FIG. 5, it will be assumed that the comfort value for each room has been converted to a single comfort value CL as opposed to a two-dimensional vector $(t_{sp}, rh_{sp})$.

Referring again to step 504, the controller 17 determines whether the overall building comfort index is below a first threshold. This determination identifies whether overall building comfort level is too low. If so, then the processor proceeds to step 506. If not, then the processor proceeds to step 508.

In step 506 (overall building comfort low), the processor causes a change in the supply air responsive to the low overall building comfort. The supply air, as is well known in the art, is the air provided to each of the ventilation dampers 30 of a building. Ultimately, the cooling and/or heating ability of the HVAC system depends largely on the temperature of the supply air. While individual room comfort may be controlled by allowing more or less chilled or heated supply air into a room, reducing (or increasing) the temperature (flow) of the supply air can greatly enhance the ability of the HVAC system to maintain desirable comfort levels throughout the entire building. As a consequence, if the overall building comfort level is too low, it is helpful to increase the cooling (or heating) capacity of the supply air. The processor therefore in step 506 causes the supply air temperature to change in response to the low comfort index. To this end, suitable control signals may be provided to an air handling unit, not shown, but which is known in the art. An air handling unit of a building controls the supply air flow and supply air temperature.

Referring to step 508 (overall building comfort level not low), the processor determines whether individual areas or rooms are below a second comfort threshold, which may suitably be the same as or different from the first threshold. If so, it is an indication that most of the building has an acceptable comfort level, but some areas do not. If some local areas have low comfort levels CL, then the processor proceeds to step 510. If not, the processor proceeds to step 512.

In step 510, the processor causes local controllers in the areas of low comfort to attempt to address the low comfort level using local control. This may involve replacing set points and/or adjusting dampers on the local level, or even using local chilling or heating devices. Such local control devices are known in the art. However, if local control options are exhausted and/or are not efficient, then the processor in step 510 as an alternative adjusts the supply air in a manner similar to that described above in connection with step 506. To this end, it is noted that even if most areas have an adequate comfort level, it may be necessary to change the supply air temperature to ensure that the problem areas have sufficient opportunity to achieve the desired comfort level. In either event, after step 510, the processor returns to step 502.

Referring now to step 512 (no individual area has low comfort), the processor determines whether the overall building comfort value exceeds a third threshold. The third threshold exceeds the first threshold. If the overall building comfort exceeds the third threshold, it is indicative of a high level of comfort throughout the building, which in turn can indicate inefficient operation of the HVAC system. By way of analogy, if a person is comfortable at 75° F., then it is inefficient to set an air condition thermostat to 70° F. If the comfort level is relatively high, it is likely that the cooling (or heating) equipment is running more than necessary.

Thus, if the overall building comfort level does not exceed the third threshold then the processor simply returns to step 502. If, however, the overall building comfort level exceeds the higher third threshold, then the processor proceeds to step 514 to attempt to address the potentially inefficient operation.

In step 514, the processor provides control signals for the supply air that result in reduced power consumption. By way of example, if it is summer, the processor may reduce the chilling of the supply air. In winter, the processor may reduce the heating of the supply air. In some cases, the overall flow of supply air may be reduced. Such changes to the supply air may all be carried out in most commercially available air handling units. The reduction of flow, or heating or chilling, results in less energy consumption by the air handling unit of the HVAC system. Because the overall comfort level of the building is relatively high, it is possible to reduce the cooling (or heating) capability of supply air with reduced risk of making the building uncomfortable.

The above-described operations benefit at least in part from the fact that building comfort does not necessarily require maintaining a strict temperature throughout a building. Instead, higher temperatures or lower temperatures may be tolerated if the combined temperature and humidity provides a comfortable environment. It will be noted that the above systems may be modified to take room air flow into account in comfort calculations and control. It is known that increased room air flow can increase comfort for a given temperature and humidity point.

It will appreciated that the above described embodiments are exemplary, and that those of ordinary skill in the art may readily devise their own implementations and modifications that incorporate the principles of the invention and fall within the spirit and scope thereof.

I claim:

1. An arrangement comprising:
    a plurality of wireless microsystems, each microsystem operable to measure at least relative humidity and temperature, and to communicate temperature and relative humidity information indicative of the measured relative humidity and temperature wirelessly to a network device, the network device operable to communicate the temperature and relative humidity information to at least a first processor configured to:
    a) obtain a comfort level value based on the measurements of relative humidity and temperature,
    b) determine if the comfort level value is within a first predefined range,
    c) cause a first change in at least one building control parameter if the comfort level is outside the first predefined range,
    d) determine if the comfort level value is within a second range, and
    e) cause a second change in the at least one building control parameter if the comfort level is within the second range and within the first predefined range.

2. The arrangement of claim 1, wherein the processor is further operable to cause the change based upon the information, the information represented as a two-dimensional vector quantity.

3. The arrangement of claim 1, wherein the processor is further operable to cause the change based upon the information, the information represented as a value representative of a combined relative humidity and temperature index.

4. The arrangement of claim 1, wherein the processor is further operable to cause the change by causing a building control device to adjust the air flow within a space of a building.

5. The arrangement of claim 1, wherein the network device is configured to communicate the temperature and relative humidity information using a communication network.

6. The arrangement of claim 1, wherein the network device and the one or more controllers are part of a field controller panel.

7. The arrangement of claim 1, wherein the microsystem includes a plurality of MEMs sensors.

8. An arrangement comprising:
    a plurality of wireless microsystems, each microsystem operable to measure at least relative humidity and temperature, to generate a combined temperature and relative humidity index, and to transmit the index wirelessly;
    a wireless device operably configured to receive the transmitted index from at least one microsystem and to provide as an output information corresponding to the received index;
    a controller operably coupled to receive the information corresponding to the index from the wireless device, the controller operable to:
    (a) determine if the information corresponding to the index is within a first predefined range,
    (b) cause a first change in at least one building control parameter if the information corresponding to the index is outside the first predefined range,
    (c) determine if the information corresponding to the index is within a second range, and
    (d) cause a second change in the at least one building control parameter if the information corresponding to the index is within the second range and within the first predefined range.

9. The arrangement of claim 8, wherein the index includes a vector including relative humidity and temperature information.

10. The arrangement of claim 8, wherein the index includes a single value representative of a combined relative humidity and temperature index.

11. The arrangement of claim 8, wherein the information corresponding to the received index is the received index.

12. The arrangement of claim 8, wherein the wireless device is coupled to the controller via a wired communication network.

13. The arrangement of claim 8, wherein the wireless network device is co-located with the controller.

14. The arrangement of claim 8, wherein the building control condition constitutes an air flow into at least a first space.

15. The arrangement of claim 8, wherein the building control condition constitutes a supply air parameter, the supply air provided to a plurality of spaces in a building.

16. The arrangement of claim 8, wherein the microsystem includes a plurality of MEMs sensors.

17. A method, comprising:
    a) measuring a relative humidity and temperature of a space using at least one wireless microsystem;
    b) obtaining a comfort level value based on the measurements of humidity and temperature in the space;
    c) transmitting the comfort level value wirelessly to a controller;
    d) determining if the comfort level value is within a first predefined range;
    e) causing a first change in at least one building control parameter if the comfort level is outside the predefined range;
    f) determining if the comfort level value is within a second range; and
    g) causing a second change in the at least one building control parameter if the comfort level is within the second range and within the first predefined range.

18. The method of claim 17, wherein step b) further comprises obtaining the comfort level value in the form of a multidimensional vector.

19. The method of claim 18, wherein step d) further comprises determining if the comfort level value is within the first predefined range by determining if the multidimensional vector falls within a comfort zone, the comfort zone forming a multidimensional space.

20. The method of claim 19, wherein the multidimensional vector is a vector (t, rh), where t is representative of temperature and rh is representative of relative humidity, and wherein the multidimensional space is a two-dimensional shaped space.

21. The method of claim 20, wherein the two-dimensional space of the comfort zone is defined by a perimeter, and wherein step f) further comprises determining if the vector (t, rh) is more than a predetermined distance from the perimeter.

22. The method of claim 17, wherein step b) further comprises obtaining the comfort level value in the form of a scalar value.

23. The method of claim 22, wherein step d) further comprises comparing the comfort level value to a first threshold.

24. The method of claim 23, wherein step f) further comprises comparing the comfort level value to a second threshold.

* * * * *